United States Patent [19]

Smith

[11] 4,353,994
[45] Oct. 12, 1982

[54] LOW-DENSITY, FURFURYL BENZYLIC PHENOLIC THERMOSETTING FOAM PRODUCT AND METHOD OF PREPARING SAME

[75] Inventor: Stuart B. Smith, Conyers, Ga.

[73] Assignee: Thermoset AG, Switzerland

[21] Appl. No.: 330,572

[22] Filed: Dec. 14, 1981

Related U.S. Application Data

[63] Continuation-in-part of Ser. No. 238,467, Feb. 26, 1981.

[51] Int. Cl.$^3$ ............................................... C08J 9/14
[52] U.S. Cl. .................................... 521/110; 521/121; 521/136; 521/149; 521/181
[58] Field of Search ............... 521/110, 121, 136, 149; 521/181

[56] References Cited

U.S. PATENT DOCUMENTS

| | | | |
|---|---|---|---|
| 3,692,706 | 9/1972 | Igglesden | 521/136 |
| 3,919,127 | 11/1975 | Larsen et al. | 521/136 |
| 3,975,319 | 8/1976 | Larsen et al. | 521/136 |

*Primary Examiner*—Morton Foelak
*Attorney, Agent, or Firm*—Richard P. Crowley

[57] ABSTRACT

A low-density, low-friability, furfuryl-phenol thermosetting foam product is prepared by reacting, in the presence of a blowing agent and an acid catalyst, a furfuryl-alcohol monomer or polymer and a benzylic-ether phenol-formaldehyde resin, having a mole ratio of benzylic-ether phenol to formaldehyde of from about 1:3 to 1:11, which reaction provides a closed-cell, thermosetting foam product having a foam density of 0.5 pound per cubic foot or less.

15 Claims, No Drawings

LOW-DENSITY, FURFURYL BENZYLIC PHENOLIC THERMOSETTING FOAM PRODUCT AND METHOD OF PREPARING SAME

REFERENCE TO PRIOR APPLICATION

This application is a continuation-in-part of U.S. patent application Ser. No. 238,467, filed Feb. 26, 1981, hereby incorporated by reference.

BACKGROUND OF THE INVENTION

Thermosetting foam products prepared by the use of phenol-formaldehyde, blowing agents and an acidic catalyst typically are characterized by having a fairly brittle foam structure with low compression strength and exhibiting high friability properties.

Furfural is an aldehyde which has been employed in various condensation reactions with many types of compounds, such as, for example, phenol, to produce condensation products. Phenol furfural resin compositions have been prepared, for example, by employing a polyalkylene polyphenol and furfural, which provides for a flexible, thermosetting resin product suitable for use in coatings and as molding compounds. Such phenol furfural resin compositions and others are described, for example, in U.S. Pat. Nos. 3,471,443 and 3,244,648.

In the parent application, it has been disclosed that thermosetting foam products of low friability and good flame resistance can be prepared by reacting a resole resin of phenol and formaldehyde with a furfuryl-alcohol polymer, particularly a substantially head-to-tail, polymerized furfurly alcohol. The thermosetting foams produced have a substantially closed-cell structure and a foam density of about 1.5 or more pounds per cubic foot. Further in the parent application, it was disclosed that, with a phenol-formaldehyde resole resin, a furfuryl-alcohol polymer must be used, and that the use of furfuryl alcohol failed to produce an acceptable foam product, in that the reactivity with the resole was so great that the resulting foamed mass overexpanded and collapsed.

SUMMARY OF THE INVENTION

My invention relates to a thermosetting foam product, to the method of preparing the foam product, and, in particular, to a low-density, thermosetting foam product characterized by low friability and flame resistance, and more particularly to a thermosetting foam product prepared by reacting a furfuryl-alcohol compound with a benzylic-ester phenol resin.

I have found that a unique thermosetting foam product, having ultralow density of about 0.5 pound per cubic foot or less, may be prepared, which foam is characterized by low friability, toughness and flame resistance, by the reaction, in the presence of a blowing agent and a strong acid catalyst, of a furfuryl-alcohol compound and a benzylic-ether phenolic-formaldehyde resin. Further, the thermosetting foam product produced provides a superior-quality foam product as regards strength characteristics and overall foam structure. The thermosetting foam product has good flame resistance and controllable foaming characteristics, which enable its use with conventional foam equipment. The foam is substantially closed-cell in structure and can be prepared to provide foam densities of 0.5 pcf or less; for example, 0.1 to 0.5 pcf.

The preparation of foams employing furfuryl alcohol, alone or in combination with phenol-formaldehyde resins, does not produce an acceptable thermosetting foam product, but, in fact, provides for hard-to-control reactions and results in thermosetting foams which are weak, brittle and generally of very nonuniform and poor cell structure. Such foam products as produced are characterized by large cells which appear to be predominantly open cells. Such thermosetting foam products would not be of commercial interest.

It has been discovered that, when a benzylic-ether phenolic resin is employed in place of the reactive phenol-formaldehyde resole resin of the parent application, wholly satisfactory foams of ultralow density and low friability can be prepared, either with furfuryl alcohol alone or with a furfuryl-alcohol polymer, or a combination thereof.

In one embodiment, a preferred and high-quality, low-density thermosetting foam product of the invention is prepared through the reaction of a one-stage benzylic-ether phenolic-formaldehyde resin; for example, wherein the mole ratio of the phenol to formaldehyde ranges from about 1:3 to 1:1; for example, 1:2 to 1:1.5, and the use of a furfuryl-alcohol polymer prepared by acid catalysis under controlled conditions of furfuryl alcohol, to provide for a polymer generally having a head-to-tail polymerization of the furfuryl alcohol, or furfuryl alcohol alone or a mixture of the polymer and the monomer.

The unique thermosetting foam product produced by such a reaction of such ingredients provides for a foam which is substantially of low-density, fine, uniform, closed-cell structure. While not wishing to be bound by any particular theory of operation, it appears that the thermosetting foam product is cured by generally simultaneous reactions in the reaction mixture, wherein the acidified benzylic phenolic resin, less reactive than the phenol-formaldehyde resole resin, cures by condensation by means of a generated exotherm, while the furfuryl-alcohol monomer and polymer react by means of lowering the acidic pH to the acid-cure level for the furfuryl alcohol or polymer. The selected and synergistic acid consumption, the controlled heat generation by means of cross-linking and generally simultaneous progress of both the condensation reaction of the phenolic resin and the further polymerization reaction of the furfuryl-alcohol polymer and the polymerization of the furfuryl-alcohol monomer provide for a unique foam, which, when completely cured in a thermosetting state, is strong, resilient, flame-resistant and has low friability when aged.

In the preparation of my thermosetting foam product, the furfuryl-alcohol polymer and the phenol-formaldehyde resin are reacted in the presence of a strong acid catalyst in an amount sufficient to effect the complete cure of the resulting foam; that is, the condensation of the phenolic resin and the polymerization of the alcohol or further polymerization of the furfuryl-alcohol polymer, and also in the presence of an expandable amount of a blowing agent.

The benzylic-ether phenol-aldehyde resin, suitable for use in preparing the foam products of the invention, is commercially available and described in U.S. Pat. Nos. 3,485,797 and 3,948,824, both hereby incorporated by reference. The benzylic-ether phenol-formaldehyde resin may be used alone or, optionally, admixed or combined with minor amounts; for example, 5% to 40% of the total resin by weight, of a single-stage, compatible phenol-formaldehyde resin, to reduce costs, provided that, where furfuryl alcohol is employed, the reactivity of the reaction mixture is not so enhanced to cause the formation of unacceptable large-cell foam products.

The phenolic resins are characterized by containing one or more units having the formula:

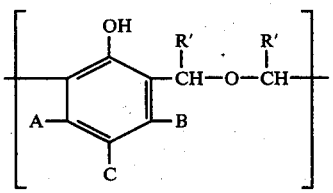

wherein A, B and C are hydrogen, hydrocarbon radicals, oxyhydrocarbon radicals or halogen and R' is individually a hydrogen or a hydrocarbon radical of 1 to 8 carbon atoms. The resins have average degrees of polymerization, as measured by the number of repeating aromatic rings, of 3 to 100, and preferably about 4 to 10.

The benzylic-ether resins are condensation polymers of a phenol having the general formula:

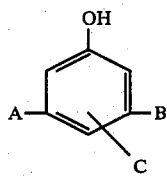

wherein A, B and C are hydrogen, hydrocarbon radicals, oxyhydrocarbon radicals or halogen, with an aldehyde, preferably formaldehyde, having the general formula R'CHO, wherein R' is a hydrogen or a hydrocarbon radical of 1 to 8 carbon atoms, prepared in the liquid phase in the substantial absence of water at a temperature below about 130° C. in the presence of catalytic concentrations of a metal ion dissolved in the reaction medium. The molar ratio of aldehyde to phenol generally can be varied from 3:1 to 1:1.

In the preferred form, these resins have the general formula:

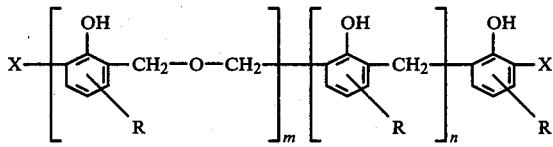

wherein R is a hydrogen or a phenolic substituent meta to the phenolic hydroxyl group, the sum of m and n is at least 2 and the ratio of m to n is at least 1, X is an end group from the group consisting of hydrogen and methylol, the molar ratio of said methylol-to-hydrogen end groups being at least 1.

The most preferred benzylic-ether resins are those in which R is hydrogen. The phenols employed in the formation of the benzylic-ether resins are generally all phenols which are not substituted at either of the carbon atoms ortho to the hydroxyl group. Any one, all or none of the remaining carbon atoms of the phenol ring can be substituted. Substituted phenols employed in the formation of the phenolic resins include: alkyl-substituted phenols; aryl-substituted phenols; cycloalkyl-substituted phenols; alkenyl-substituted phenols; alkoxy-substituted phenols; aryloxy-substituted phenols; and halogen-substituted phenols, the foregoing substituents containing from 1 to 26 and preferably from 1 to 6 carbon atoms. Specific examples of suitable phenols, aside from the preferred unsubstituted phenol, include: m-crosol; p-crosol; 3,5-xylenol; 3,4-xylenol; 3,4,5-trimethyl phenol; 3-ethyl phenol; 3,5-diethyl phenol; p-butyl phenol; 3,5-dibutyl phenol; p-amyl phenol; p-cyclohexyl phenol; p-octyl phenol; 3,5-dicyclohexyl phenol; p-phenyl phenol; p-crotyl; phenol; 3,5-dimethoxy phenol; 3,4,5-trimethoxy phenol; p-ethoxy phenol; p-butoxy phenol; 3-methyl-4-methoxy phenol; and p-phenoxy phenol.

Typical blowing agents which may be employed, in preparing my thermosetting foam product, include physical and chemical blowing agents, as well as mechanical blowing techniques, but the preferred blowing agent and technique comprise the employment of liquid physical blowing agents which are volatile liquids introduced into the reaction mixture, and which produce a blowing gas through vaporization of the blowing agent, or through decomposition of the blowing agent during the exotherm. Suitable blowing agents are short-chain aliphatic hydrocarbons; for example, in the $C_3$-$C_7$ range, and their chlorinated and fluorinated analogs, such as fluoro and chloro alkanes known as Freon (a registered trademark of E. I. du Pont de Nemours & Co.) and methylene chloride and similar blowing agents. The blowing agents may be employed in amounts ranging from about 0.5 to 15 parts; for example, 1 to 10 parts per 100 parts by weight of the resin polymer employed in the reaction mixture.

Further, it is desirable and necessary to employ, within the reaction mixture in preparing the thermosetting foam product of the invention, a small, but effective, amount of a surfactant to act as a cell-control or nucleating agent, to produce a uniform, fine, cellular structure. Typical surfactants employed would include silicone surfactants in the amount generally of from 0.05 to 5 parts by weight; for example, 0.1 to 2 parts by weight, of the surfactant to the 100 parts by weight of the resin polymer in the reaction mixture. Typical silicone surfactants which may be employed include non-hydrolyzable silicone surfactants, such as those described in U.S. Pat. Nos. 3,772,224 and 3,849,156, and those polyalkylene glycol silicones and block copolymers.

A wide variety of strong acid catalysts may be employed in the reaction mixture, to provide for a pH of approximately 1.5 to 5 in the reaction mixture, to effect the condensation and polymerization reactions. Typical acid catalysts suitable for use would include phosphoric and sulfonic acid catalysts, such as sulfonic acid, phosphoric acid, toluene sulfonic acid and alkane sulfonic acid, such as methane sulfonic acid, as well as strong organic acids, such as oxalic acid, and hydrochloric acid and sulfuric acid. The acid catalyst may be employed in minor amounts sufficient to effect the desired reaction, but typically ranges from about 0.5 to 15 parts; for example, 1 to 10 parts, by weight of the acid catalyst per 100 parts by weight of the resin polymer employed in the reaction mixture.

Also, optionally, it has been found that the addition of a small amount of from about 0.1 to 8.0 weight percent; for example, 0.5% to 5%, to the reaction mixture of a styrene monomer provides a foam which promotes a substantially closed-cell structure. The styrene monomer may comprise styrene or an alkyl styrene, such as methyl styrene, or other styrene monomers or combinations thereof. It has been observed that the addition of a styrene monomer reduces the reaction mixture exotherm, and, while not wishing to be bound by any theory or mechanism of operation, the reduced exotherm may reduce the number of cell ruptures, permitting the formation of a closed-cell foam product.

Optionally, as desired, a wide variety of other chemicals, additives, fillers, property enhancers and reinforcers may be incorporated in the resinous reaction mixture, such as, for example, antioxidants, antistatic agents, biocides, dyes, fibers, particles, clays, fillers, flame retardants, fungicides, heat stabilizers, lubricants, plasticizers, viscosity-control agents and the like.

In the method of preparing the thermosetting foam products, the furfuryl-alcohol monomer, polymer or mixture, having reactive free-hydroxy groups, and the single-stage benzylic-ether phenol-formaldehyde resin are mixed together and are mixed with the blowing agent and other material and an acid catalyst added, to generate the exotherm and to provide for the curing of both the phenolic resin and the furfuryl polymer. The reaction may be commenced at room temperature and may be carried out commencing from about 60° F. and range from the exotherm to 250° F.; for example, from 80° F. with the exotherm rising to 180° F. In practice, the mixture of the weight percent of the furfuryl alcohol or polymer and the benzylic-ether phenolic-formaldehyde resin employed may vary from about 10% to 90%. However, due to the high cost of the furfuryl alcohol and polymer, it is often desired to employ a majority of the reaction mixture as the benzylic-ether phenol-fomaldehyde, and, thus, the amount of furfuryl alcohol or polymer to the benzylic-ether phenolic-formaldehyde resin may vary, in the preferred embodiment, from about 15% to 50%.

My unique thermosetting foam product and the method of preparing the foam product will be set forth for the purpose of illustration only in certain embodiments; however, it is recognized that various changes, modifications and improvements may be made thereon by a person skilled in the art, all falling within the scope and content of my invention.

DESCRIPTION OF THE EMBODIMENTS

Example 1

A thermotting reaction mixture was prepared at room temperature by mixing together the following formulation:

|   |   | Parts by Weight |
|---|---|---|
| 1. | Phenol-formaldehyde resin - 2014/94** | 100 |
| 2. | Furfuryl-alcohol polymer - QX 1300* | 20 |
| 3. | Surfactant (DC 193 - a silicone surfactant of Dow-Corning Co.) | 2 |
| 4. | Blowing agent - Freon 11 (a product of E.I. du Pont de Nemours & Co.) | 10 |
| 5. | Acid catalyst - methane sulfonic acid | 20 |
|   | TOTAL | 152 |

*a furfuryl-alcohol polymer of Quaker Oats Company, viscosity 320 cps, specific gravity 1.36
**a phenol-formaldehyde resin of Georgia Pacific Corp., mole ratio of phenol to formaldehyde 0.1 to 1.4, viscosity 2000 cps, specific gravity 1.26, free phenol 10%, free formaldehyde 1%, solids 75%

The reaction mixture had an exotherm and produced a very fine-cell, closed-foam structure having a density of 2.0 pounds per cubic foot and low friability.

EXAMPLE 2

A thermosetting reaction mixture was prepared at room temperature by mixing together the following formulation:

|   |   | Parts by Weight |
|---|---|---|
| 1. | Phenol-formaldehyde resin | 100 |
| 2. | Furfuryl alcohol | 20 |
| 3. | Surfactant (DC 193) | 2 |
| 4. | Blowing agent - Freon 11 | 10 |
| 5. | Acid catalyst - methane sulfonic acid | 20 |
|   | TOTAL | 152 |

Foam density was not determined, since foam mass collapsed.

EXAMPLE 3

A thermosetting reaction mixture of the invention was prepared at room temperature by mixing together the following formulation:

|   |   | Parts by Weight |
|---|---|---|
| 1. | Benzylic-ether phenolic-formaldehyde resin (Ashland Chemical Co. #220) | 100 |
| 2. | Furfuryl-alcohol polymer - QX 1300 | 20 |
| 3. | Surfactant (DC 193) | 2 |
| 4. | Blowing agent - Freon 11 | 10 |
| 5. | Acid catalyst - methane sulfonic acid | 20 |
|   | TOTAL | 152 |

The phenol-formaldehyde foam produced from this reaction had a low density of 0.3 pcf and was produced with a closed-fine-cell structure.

EXAMPLE 4

A thermosetting reaction mixture of the invention was prepared at room temperature by mixing together the following formulation:

|   |   | Parts by Weight |
|---|---|---|
| 1. | Benzylic-ether phenolic resin | 100 |
| 2. | Furfuryl alcohol | 20 |
| 3. | Surfactant (DC 193) | 2 |
| 4. | Blowing agent - Freon 11 | 10 |
| 5. | Acid catalyst - methane sulfonic acid | 20 |
|   | TOTAL | 152 |

The foam product had a foam density of 0.25 pcf, low friability and closed-cell structure.

As set forth in Examples 3 and 4, the thermosetting foam product provided for a controllable reaction and the production of a substantially closed-cell, fine cellular structure, low-friability, high flame-resistant, modified phenol-formaldehyde, furfuryl-type, low-density foam suitable for use, for example, for foam-insulation purposes and for other purposes, where such flotation, low-density foam products may be employed.

Examples 1 and 2, directed to the use of phenol-formaldehyde foam with furfuryl alcohol or furfuryl-alcohol foam, produced an unacceptable foam product with the furfuryl alcohol and a high-density foam product with the furfuryl-alcohol polymer.

What I claim is:

1. A method of preparing an ultralow-density thermosetting foam product composed substantially of closed cells and characterized by low friability, which method comprises: reacting a furfuryl compound, selected from the group consisting of a furfuryl-alcohol mnomer, a furfuryl-alcohol polymer or mixtures thereof, with a benzylic-ether phenolic-formaldehyde resole resin, the benzylic-ether resole resin having a mole ratio of formaldehyde to benzylic-ether phenol of from about 3:1 to 1:1, the reaction carried out in the presence of a sufficient amount of a blowing agent to form a low-density foam and a catalytic amount of a strong acid catalyst, to provide a thermosetting foam product having a foam density of less than about 0.5 pound per cubic foot.

2. The method of claim 1 wherein the furfuryl-alcohol polymer comprises an acid-catalyzed furfuryl-alcohol polymer which generally comprises a head-to-tail polymerization of the furfuryl alcohol in the polymer chain, and having reactive hydroxyl groups in the polymer.

3. The method of claim 1 wherein the benzylic-ether phenolic-formaldehyde resin comprises a single-stage resin, and wherein the mole ratio of phenol to formaldehyde ranges from about 1:1 to 1:1.6.

4. The method of claim 1 wherein the acid catalyst comprises a sulfonic-acid catalyst.

5. The method of claim 4 wherein the sulfonic-acid catalyst comprises an alkene sulfonic acid or a toluene sulfonic acid.

6. The method of claim 1 which includes, in the reaction mixture, a cell-control amount of a silicone surfactant.

7. The method of claim 1 wherein the reaction is carried out at a temperature ranging from about 60° F. to 180° F.

8. The method of claim 1 wherein the amount of the furfuryl-alcohol polymer and the amount of the benzylic-ether phenolic-formaldehyde resin range from about 10% to 90% by weight of the reaction mixture.

9. The method of claim 1 wherein the blowing agent is present in an amount ranging from about 1 to 15 parts by weight of the polymer resin in the reaction mixture.

10. The method of claim 1 wherein the acid catalyst is present in an amount ranging from about 0.05 to 10 parts per 100 parts by weight of the resin polymer in the reaction mixture.

11. The method of claim 1 which includes adding from about 0.1 to 8.0 weight percent of the reaction mixture of a styrene monomer, to provide a closed-cell foam product.

12. The method of claim 1 which includes from about 10% to 40% by weight of the resin of a resole phenol-formaldehyde resin.

13. The method of claim 1 wherein the benzylic-ether phenolic resin has the general formula:

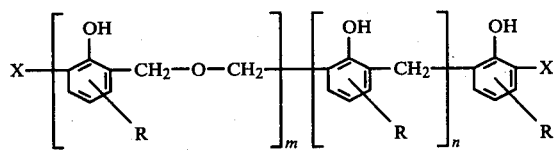

wherein R is hydrogen, the sum of m and n is at least 2, the ratio of m to n is at least 1 and X is hydrogen.

14. A method of preparing a thermosetting foam product, which method comprises: reacting a furfuryl compound, selected from the group consisting of a furfuryl-alcohol polymer, a furfuryl alcohol or mixtures thereof, with a benzylic-ether phenolic-formaldehyde resin, having 4 to 10 phenolic rings and having a mole ratio of phenol to formaldehyde of from about 1:1 to 1:2, in the presence of from about 1 to 15 parts per 100 parts of polymer and resin of a blowing agent and of from about 0.05 to 10 parts per 100 parts of polymer and resin of a catalytic amount of a sulfonic-acid catalyst and a small cell-control amount of a silicone surfactant, to effect the generally simultaneous condensation of the phenol-formaldehyde resin and the condensation of the furfuryl compound, the amount of the polymer and the resin ranging from about 10% to 90% by weight of the reaction mixture, to provide an integral thermosetting foam product characterized by a low density of about 0.5 pcf or less and low friability.

15. The method of claim 14 which includes adding from about 0.5 to 5.0 weight percent of the reaction mixture of a styrene monomer, to provide a substantially closed-cell foam product.

* * * * *

UNITED STATES PATENT AND TRADEMARK OFFICE
CERTIFICATE OF CORRECTION

PATENT NO. : 4,353,994

DATED : October 12, 1982

INVENTOR(S) : Stuart B. Smith

It is certified that error appears in the above-identified patent and that said Letters Patent is hereby corrected as shown below:

Column 7, claim 1, line 10, delete "mnomer" and insert therefor --monomer--.

Column 7, claim 5, line 2, delete "alkene" and insert therefor --alkane--.

Column 7, claim 9, line 46, after "15 parts" add --per 100 parts--.

Column 8, claim 10, line 3, delete "resin polymer" and insert therefor --polymer resin--.

Column 8, claim 14, line 32, delete "and" first occurrence.

Column 8, claim 14, line 33, delete "and".

Signed and Sealed this

Twenty-eighth Day of December 1982

[SEAL]

Attest:

GERALD J. MOSSINGHOFF

Attesting Officer  Commissioner of Patents and Trademarks